United States Patent [19]

Stenger et al.

[11] Patent Number: 4,787,701

[45] Date of Patent: Nov. 29, 1988

[54] OPTICAL FIBER CONTACT ASSEMBLY

[75] Inventors: Donald C. Stenger, Pleasanton; Roger H. Ellis, Atherton, both of Calif.

[73] Assignee: Raychem Corp., Menlo Park, Calif.

[21] Appl. No.: 671,145

[22] Filed: Nov. 13, 1984

[51] Int. Cl.⁴ .............................................. G02B 6/38
[52] U.S. Cl. .................... 350/96.21; 350/96.20
[58] Field of Search ............... 350/96.10, 96.20, 96.21, 350/96.22, 96.23

[56] References Cited

U.S. PATENT DOCUMENTS

| 2,027,962 | 1/1936 | Currie | 264/230 |
|---|---|---|---|
| 3,086,242 | 4/1963 | Cook et al. | 264/566 |
| 3,597,372 | 8/1971 | Cook | 523/300 |
| 3,990,779 | 11/1976 | McCartney | 350/96.21 |
| 4,140,366 | 2/1979 | Makuch et al. | 350/96.21 |
| 4,178,068 | 12/1979 | Hoover | 350/96.21 |
| 4,279,469 | 7/1981 | Forman | 350/96.22 |
| 4,290,668 | 9/1981 | Ellis et al. | 350/96.20 |
| 4,411,491 | 10/1983 | Larkin et al. | 350/96.21 |
| 4,490,007 | 12/1984 | Murata | 350/96.21 |
| 4,606,603 | 8/1986 | Cairns | 350/96.21 |
| 4,725,117 | 2/1988 | Ellis | 350/96.20 |
| 4,733,935 | 3/1988 | Gandy | 350/96.21 |
| 4,733,936 | 3/1988 | Mikolaicyk et al. | 350/96.21 |
| 4,735,480 | 4/1988 | Levinson et al. | 350/96.21 |

FOREIGN PATENT DOCUMENTS

| 0119013 | 9/1984 | European Pat. Off. | 350/96.21 |
|---|---|---|---|
| 0118804 | 9/1984 | European Pat. Off. | 350/96.21 |
| 2512218 | 3/1983 | France | 350/96.21 |

Primary Examiner—William L. Sikes
Assistant Examiner—Brian M. Healy
Attorney, Agent, or Firm—Dennis E. Kovach; Herbert G. Burkard

[57] ABSTRACT

An assembly for interconnecting a plurality of first contacts disposed in a ribbon array with a plurality of second contacts, also disposed in a ribbon array, includes a plurality of cylindrical radial springs which are split longitudinally along an axial direction of the contacts, each radial spring providing three common lines of contact with the mating first and second contacts so as to precisely align front ends of mating the first and second contacts. The assembly further includes dynamic seals on opposite ends of an alignment insert which contains the cylindrical, radial springs, the dynamic seals preventing foreign matter from entering an interface between front ends of the mating first and second contacts, and also functioning to dampen shock- and vibration-induced displacements of the mating first and second contacts.

16 Claims, 6 Drawing Sheets

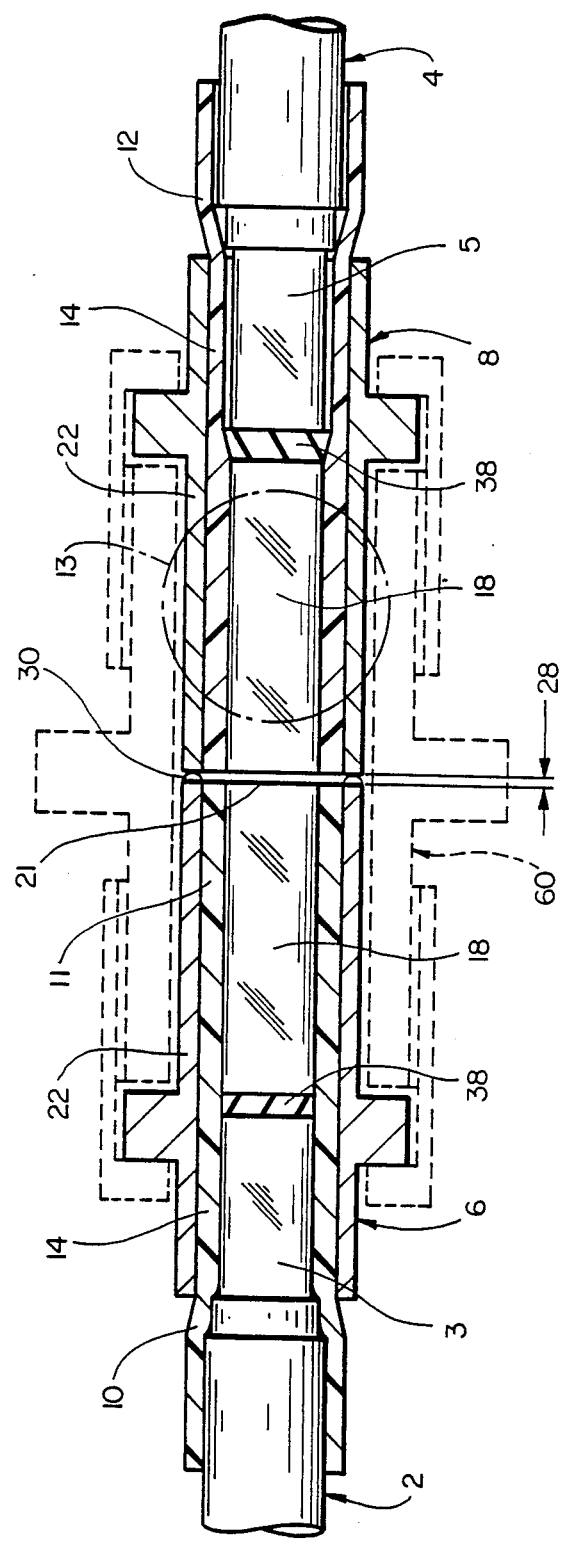
FIG_1A

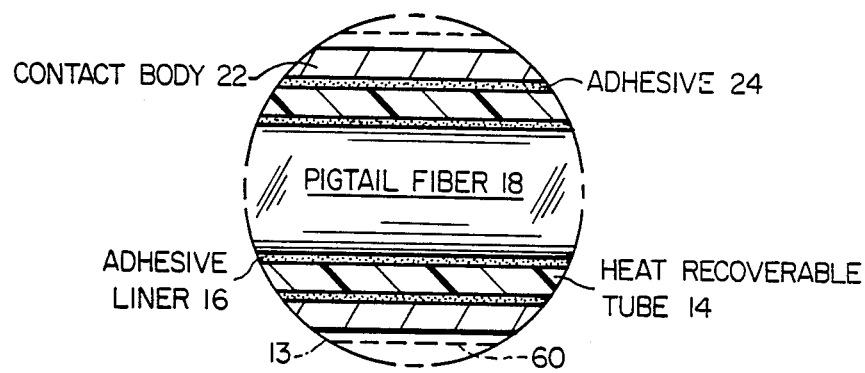
FIG_1B
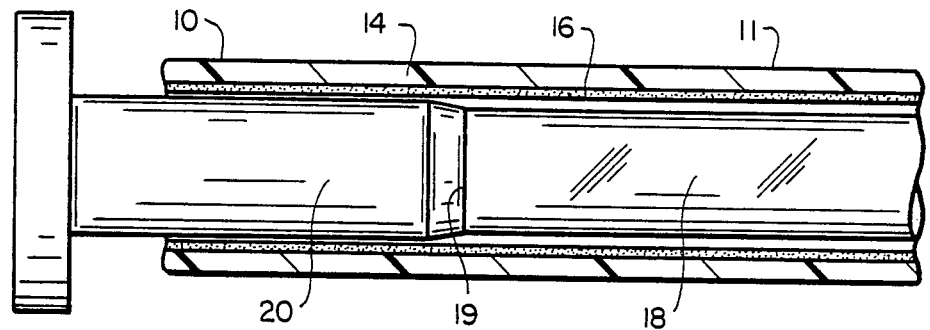
FIG_2
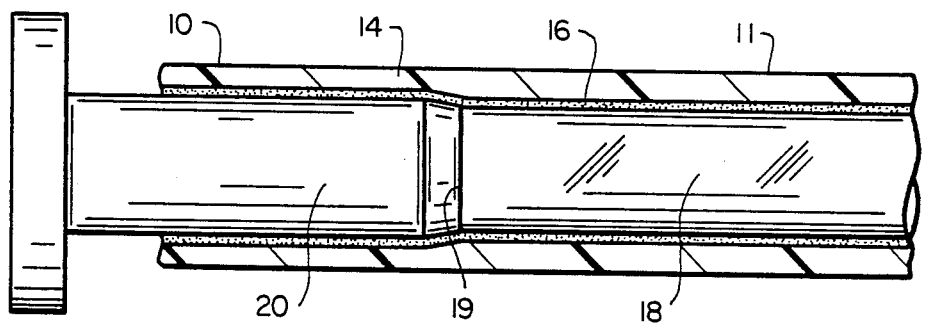
FIG_3

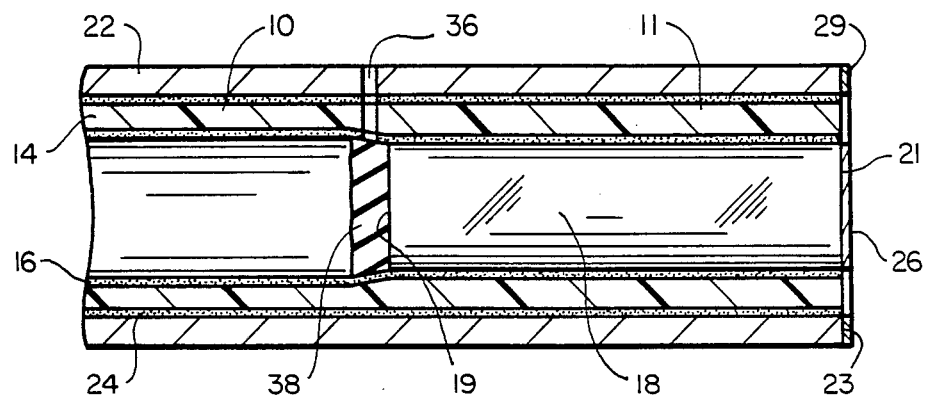
FIG_4
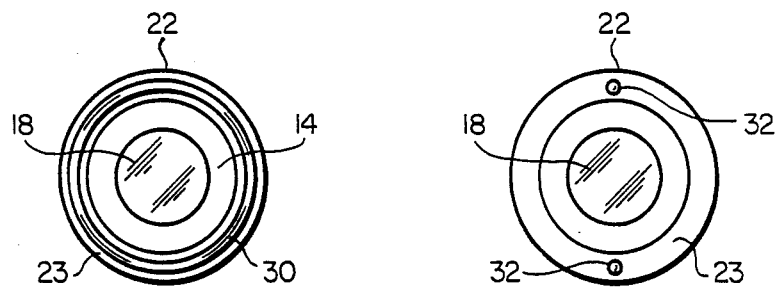
FIG_5A   FIG_5B
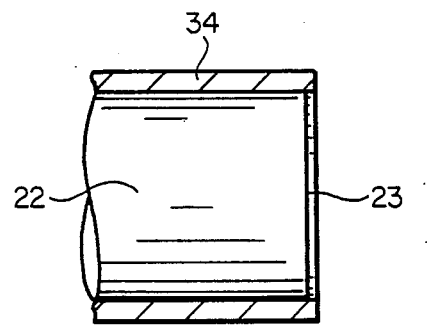
FIG_5C

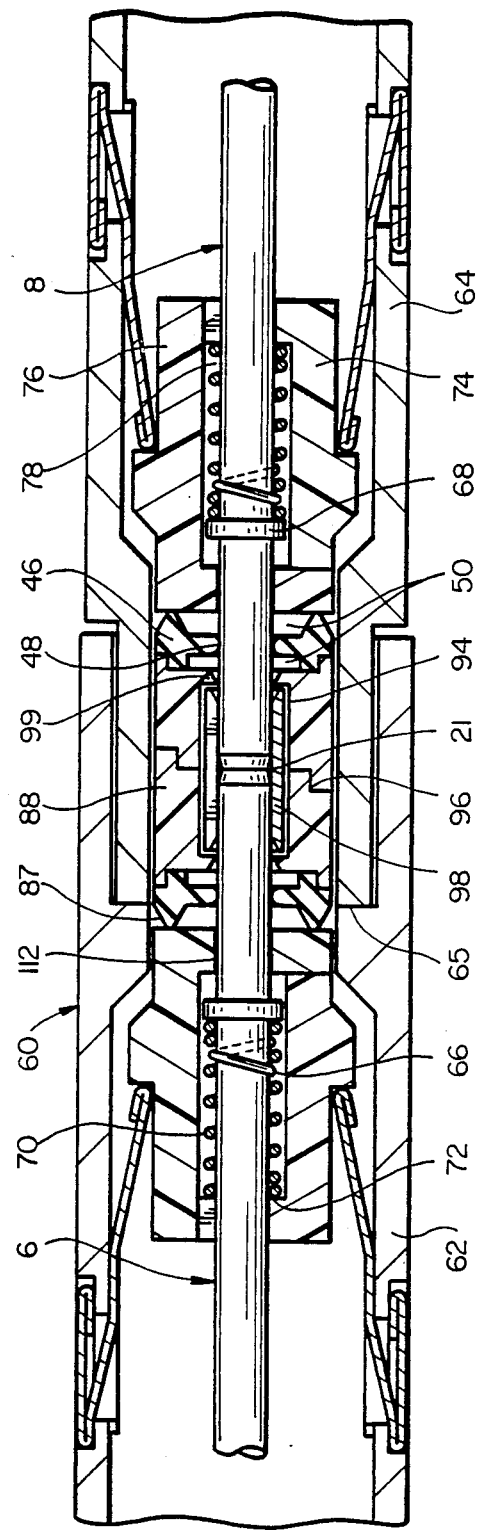
FIG_6

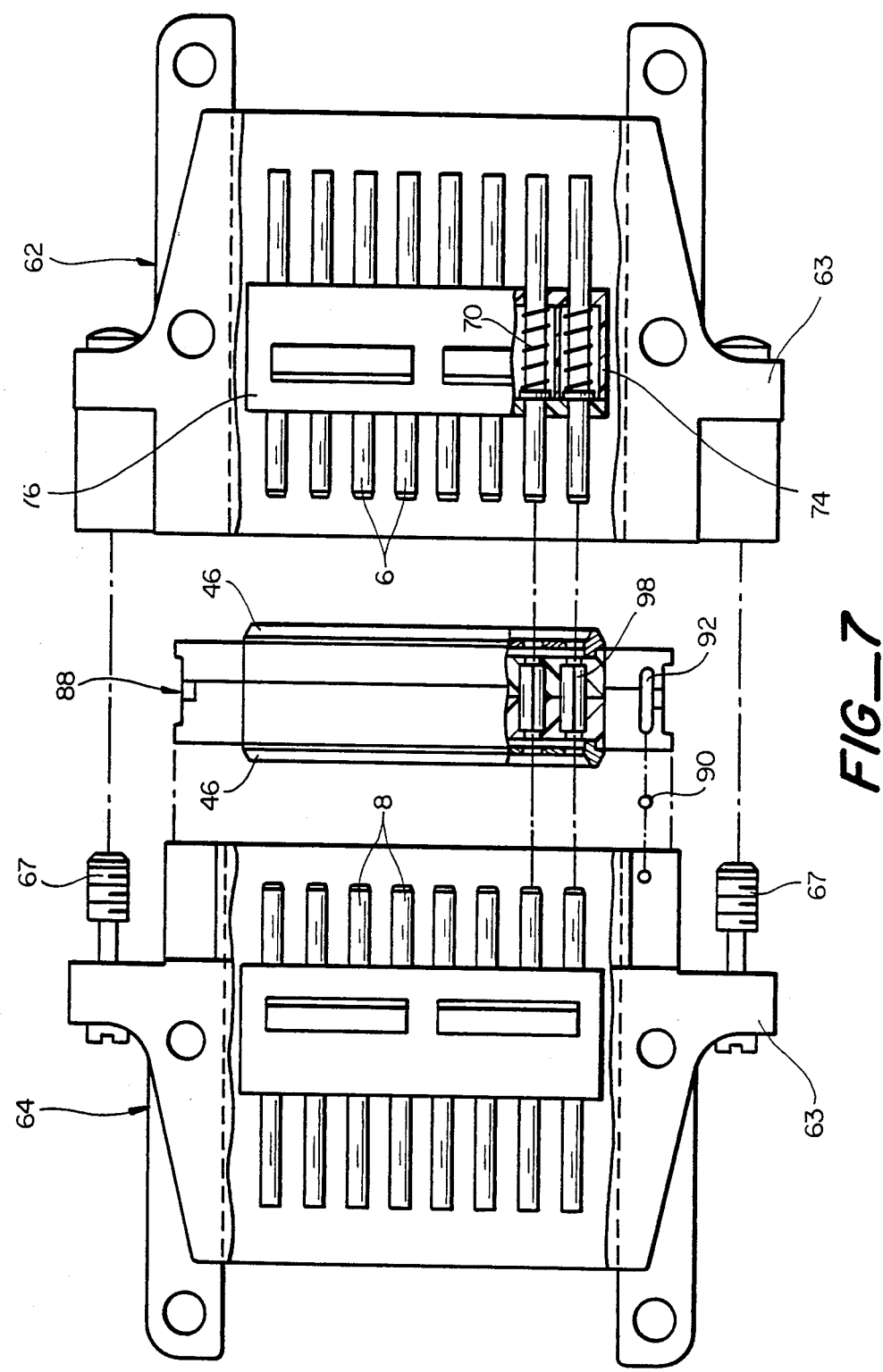

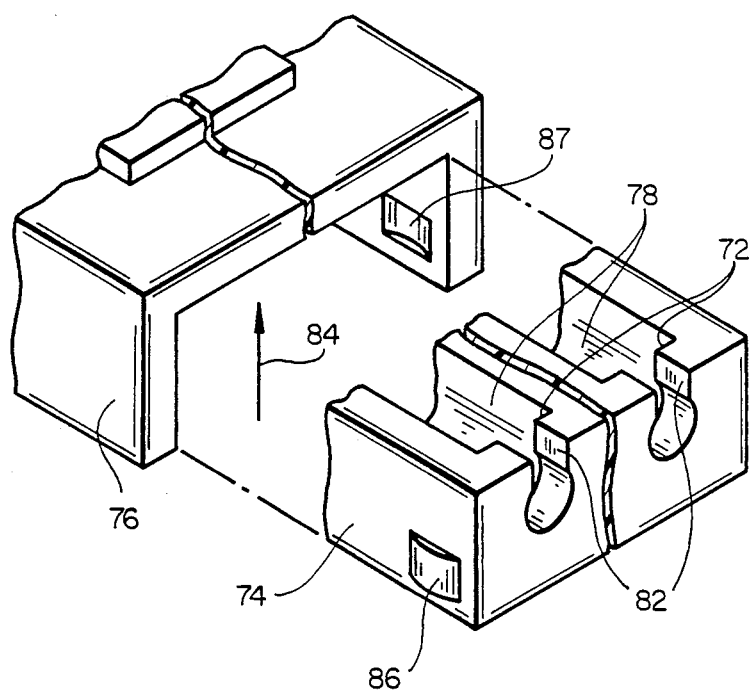
FIG_8
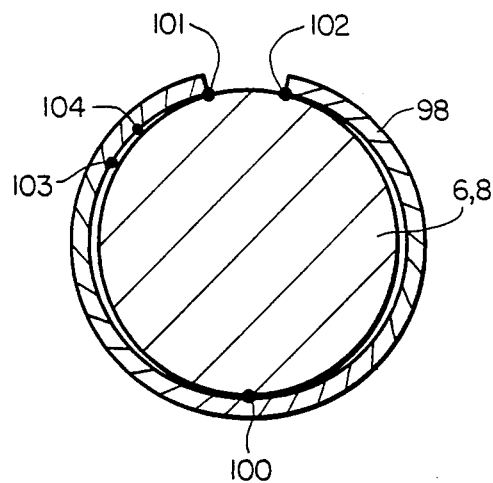
FIG_9

OPTICAL FIBER CONTACT ASSEMBLY

BACKGROUND OF THE INVENTION

The present invention relates to an optical fiber contact assembly for aligning optical fiber contacts described and claimed in co-pending U.S. application entitled "Optical Fiber Contact", this application being filed concurrently herewith. The contacts are used for terminating first and second optical fibers to be optically connected.

Numerous optical fiber connection assemblies have been proposed in the art with prior each possessing several disadvantages. In particular, most assemblies require the craftsman to align a fiber to be connected with a contact, this being oftentimes extremely difficult because of small tolerances involved when trying to precisely position an optical fiber core within the contact. Not only is the craftsman responsible for the precise positioning, the craftsman is also required to epoxy the optical fiber to be terminated within the contact, and is furthermore responsible for carefully preparing an end of the optical fiber after it has been epoxied within the contact so that a good optical surface exists to be matable with another contact. Furthermore, the craftsman is required to control intermating dimensions between first and second contacts expoxied to first and second fibers to be connected. Such procedures are extremely craft-sensitive and hard to reliably and repeatably perform in the field where specialized equipment accessible in the laboratory is often not available, making connections with prior art connection assemblies inherently unfavorable.

Other types of connection assemblies incorporate either liquids, greases, or lenses as part of an interface construction between contacts to be mated, the disadvantage with liquids being the possibility of contamination and spillage, with the problem of lenses being related to complexity of design of the fiber and lens interface as well as poor resistance to radiation since lenses often turn black when irradiated.

SUMMARY OF THE INVENTION

Accordingly, it is an object of the present invention to eliminate the above-noted drawbacks and to provide an optical fiber contact assembly which does not require that the user epoxy, polish, or control an intermating dimension between contacts being aligned and connected.

It is a further object of the present invention to provide an optical fiber contact assembly which is relatively simple in construction and does not require the use of any type of lens system.

It is a further object of the present invention to eliminate the requirement that the craftsman center, polish, and control an intermating dimension of an optical fiber contact being connected to another optical fiber contact.

These and other objects of the present invention are achieved by an optical fiber contact assembly which optically aligns first and second optical fiber contacts, each of the contacts including a tube made of a memory material. A pigtail optical fiber, having a cleaved or polished back end, is installed in a first tube section which is subsequently recovered causing it to shrink radially inward and tightly adhere to the pigtail optical fiber. A second tube section adjacent to the first tube section is prevented from recovering as first tube section is recovered.

The assembly includes an alignment sleeve for aligning ends of first and second contacts to be optically connected, the alignment sleeve comprising a cylindrical radial spring which is split axially. Dynamic seals are provided on opposite ends of an alignment insert which contains the alignment sleeve for sealing front ends of the contacts being aligned so as to prevent contamination thereof. Means are provided for biasing the first and second contacts towards one another, and a spring constant of the cylindrical radial spring is maintained less than the biasing means so as to allow shock- and load-induced displacements of the contacts.

BRIEF DESCRIPTION OF THE DRAWINGS

FIGS. 1A, 1B illustrate partial cross-sectional views of a contact assembly constructed according to a preferred embodiment of the present invention;

FIG. 2 illustrates part of an optical fiber contact shown in FIG. 1 prior to its being secured to a pigtail optical fiber;

FIG. 3 illustrates the optical fiber contact of FIG. 2 subsequent to it being secured to the pigtail optical fiber;

FIG. 4 is an illustration of a front end of one embodiment of a completed optical fiber contact;

FIGS. 5a–5c illustrates three embodiments for controlling an interface dimension between first and second optical fiber contacts to be connected by a contact assembly;

FIG. 6 illustrates a side, partial cross-sectional view of one embodiment of an optical fiber contact assembly for connecting optical fiber contacts constructed in accordance with the present invention;

FIG. 7 is a top view of the assembly shown in FIG. 6.

FIG. 8 is a perspective view of wafers utilized in the optical fiber contact assembly of FIG. 6 and 7; and FIG. 9 is an end view of an alignment sleeve shown in FIG. 6.

DESCRIPTION OF THE PREFERRED EMBODIMENTS

Referring first to FIG. 1A, an optical fiber contact assembly 60 is schematically shown, and this assembly optically aligns and connects first and second optical fibers 2, 4. The first optical fiber 2 has been terminated to a first optical fiber contact 6 by inserting a stripped and cleaved front end 3 of the first optical fiber into a back end of the first optical fiber contact 6, and then recovering a back end tube section 10 of the first optical fiber contact 6 around the stripped and cleaved end 3. In this figure a back end tube section 12 of the contact 8 has not been recovered onto a stripped and cleaved front end 5 of the second optical fiber 4, the section 12 being shown in its nonrecovered state in FIG. 1 to more clearly illustrate the present invention, though it should be understood that the tube section 12 would be recovered and connected to the stripped and cleaved end 5 prior to connecting the second optical fiber contact 8 with the first optical fiber contact 6 using the optical fiber contact assembly 60.

Throughout the figures, dimensions are not shown to scale and in many instances are exaggerated to more clearly illustrate various features of the invention. Each optical fiber contact 6, 8 preferably, though not necessarily, is identical in construction and several elements thereof within circle 13 are more clearly illustrated in FIG. 18. Each contact 6, 8 includes a heat-recoverable tube 14 which is constructed of a memory material, e.g., any material exhibiting the property of elastic or plastic memory as described, for example, in U.S. Pat. Nos. 2,027,962; 3,086,242; and 3,597,372; the disclosures of which are incorporated herein by reference. The memory material is first shaped into the shape of a tube, and subsequently either expanded longitudinally or circumferentially, and preferably both longitudinally and circumferentially. Such an expanded tube exhibits the property that upon being recovered, it tends to recover to its original nonexpanded tube shape as is well understood in the art. Recovery is generally accomplished by heating, though other means can be used. An adhesive liner 16 is disposed on an inner surface of the expanded heat-recoverable tube 14 to facilitate bonding to a pigtail optical fiber 18 at the back ends 3, 5.

FIGS. 2-4 illustrate various stages through which the optical fiber contact 6, 8 proceeds during manufacturing. In FIG. 2, the pigtail optical fiber 18 is shown disposed within the expanded heat-recoverable tube 14 and the adhesive liner 16 prior to recovery of the tube 14. The pigtail optical fiber 18 is disposed in a front end section 11 of the tube 14, and a mandrel 20 is disposed in the back end section 10 of the tube 14. The mandrel 20 prevents any recovery of the back end section 10 as the front end section 11 is recovered around the pigtail optical fiber 18, preferably using heat. If desired, an outer circumferential surface of the front end section 11 can be confined during recovery to enhance radial shrinkage of the section 11. Adherence strength between the pigtail optical fiber 18 and the front end section 11 of the tube 14 is enhanced by hoop forces generated during recovery of the front end section 11, as well as by the adhesive 16 located between the pigtail optical fiber and the front end section 11. Preferably, the adhesive 16 comprises a hot-melt adhesive which, once cooled, possesses sufficient bonding strength and hardness to keep the pigtail optical fiber aligned and bonded in place to the front end section 11. The adhesive 16 further functions to provide a void- and moisture-free installation which eliminates the formation of microcracks from forming on a surface of the pigtail optical fiber 3 which has had its buffer coating removed (in the case of a glass-on-glass pigtail optical fiber).

The pigtail optical fiber 18 preferably comprises an identical-type fiber as the fiber 2 or 4 to be terminated. In the event the fiber to be terminated comprises a plastic clad silica optical fiber, then optimally the pigtail optical fiber would also comprise a plastic-clad silica fiber. In this case, the plastic cladding of the pigtail optical fiber would be removed prior to securing the pigtail optical fiber within the front end section 11 of the tube 14. In this event, the adhesive 16 preferably should have a lower index of refraction than the core of the pigtail optical fiber 18 so as to form a waveguide therewith. A suitable material for the adhesive is $PVF_2$ (polyvinylidine fluoride), such a material being described in U.S. Pat. No. 4,290,668, the disclosure of which is incorporated herein by reference. Another material is polyamide.

When the pigtail optical fiber is a glass-on-glass optical fiber, its buffer is removed, and in this case the adhesive material 16 is made from a material which forms a secure bond to glass, such as a water-resistant epoxy, so as to prevent moisture from attacking an outer glass surface of the pigtail optical fiber.

The tube 14 and adhesive liner 16 are preferably formed of materials which have a certain percentage, e.g., 10-40%, of longitudinal shrink so as to allow the tube 14 and adhesive liner 16 to shrink longitudinally when recovered which aids in bonding and aligning the pigtail optical fiber 3 with the stripped and cleaved front end 3 of the optical fiber 2 to be terminated when the back end section 10 is recovered onto the end 3, as subsequently described. The tube 14 and liner 16 can have up to 100% radial shrink. Regardless of the type of pigtail optical fiber used, either plastic-clad silica or glass-on-glass, a back end 19 of the pigtail optical fiber 18 is either cleaved or polished prior to securing the pigtail optical fiber within the front end section 11 of the tube 14.

Referring next to FIG. 4, subsequent to securing the pigtail optical fiber 18 within the front end section 11, the mandrel 20 is removed from the back end section 10 of the tube 14, and the tube 14 is secured to a contact body 22, preferably made of metal, in such a manner so as to position the center axis of the pigtail optical fiber 18 within a geometric center of the metal contact body 22. The tube 14 is secured to the contact body 22 via a second adhesive liner 24, and care is taken to keep the back end section 10 of the tube 14 from recovering when the contact body 22 is secured to the tube 14. Thereafter, a front end 21 of the pigtail optical fiber 18 is ground and made square, polished, and preferably coated with an anti-reflective coating 26.

FIGS. 4 and 5a-5c illustrate four embodiments for controlling an interface spacing 28 (see FIG. 1A) between mating first and second optical fiber contacts 6, 8 optically connected by the optical fiber contact assembly 60. In FIG. 4, a thin film 29, preferably metal, has been deposited on a front face 23 of the contact body 22. In the embodiment of FIG. 5A, a circular ridge 30 is formed on the front face 23 of the contact body 22, this ridge bottoming on a similar ridge formed on a mating contact when connected thereto by the assembly 60, as generally illustrated in FIG. 1. In FIG. 5B small protuberances 32 are formed on the front end 23 of the contact body 22. According to this embodiment, the protuberances are designed to have a height equal to the desired interface spacing 28 since the protuberances on one contact are not intended to bottom on the protuberances of a mating contact; whereas in the embodiment of FIG. 5a, a height of the ridge 32 is equal to one-half the desired interface spacing 28 since the ridge 30 is designed to bottom on a similar ridge on the mating contact. In the embodiment of FIG. 5c, a sleeve 34 is secured around the contact body 22, the sleeve extending beyond the front face 23 of the contact body 22 a predetermined and precisely controlled distance which again is equal to one-half the desired interface spacing 28.

Preferably, aligned bores 36 (FIG. 4) are formed in the tube 14, the contact body 22 (including adhesives 16, 24), and the sleeve 34 (if utilized), the bores 36 being utilized for injecting an index-matching grease 38 adjacent to the back end 19 of the pigtail optical fiber 18 to optimize optical contact between the back end 19 and a front end 3 of the optical fiber being terminated. Subsequent to injecting the grease 38 as described, preferably a plug (not shown) is inserted into a back end of the contact 6, 8 to prevent contamination of the contact, which plug is removed when the craftsman wishes to terminate the optical fiber 2. Alternatively, the index-matching grease 38 can be disposed on a front face of an extended member of the plug and inserted into the back end of the optical fiber and adjacent the back end 19 of the pigtail optical fiber 18 simply by inserting the plug therein.

The optical contacts 6, 8, as described, are manufactured at a factory where precision grinding, polishing, and coating techniques can be employed, and as delivered to a craftsman include the substantially nonrecovered back end section 10 of the tube 14 as well as the above-described plug which keeps dirt and foreign matter out of the back end section 10 prior to terminating an optical fiber 2, 4. To use the optical contact 6, 8, a craftsman simply removes the buffer of an end 3 of a glass-on-glass optical fiber being terminated, or removes the cladding if the fiber being terminated is a plastic-clad silica fiber, and then either polishes or cleaves the end 3, 5. Thereafter, the plug is removed from the back end section 10, and the cleaved or polished end 3, 5 of the optical fiber 2, 4 is inserted into the section 10 of the tube 14. Subsequently, the section 10 is recovered by any appropriate means, such as heat, and caused to shrink radially inwards which bonds and aligns the end 3 of the fiber 2 to the back end 19 of the pigtail optical fiber 18 by the common tubing surface of the adhesive liner 16 and heat-recoverable tube 14.

Preferably, the section 10 of the tube 14 is recovered by first heating sections thereof most remote from the grease with heating progressively continuing in the direction of the grease. Such a process allows air or excess grease to escape via the bores 36, thus minimizing air entrapment problems and also serves to minimize the spacing between the back end 19 of the pigtail optical fiber 18 and the front end 3, 5 of the optical fiber 2, 4. A desirable spacing would be less than 0.076 mm. Since the section 10 has been previously expanded circumferentially and longitudinally, as this section recovers, it will tend to recover axially towards the back end 19 as well as radially inward which moves the front end 3, 5 of the optical fiber 2, 4 towards the back end 19 of the pigtail optical fiber 18, and further provides the circumferential force to cause the adhesive liner 16 to bond to the front end 3, 5 of the fiber 2, 4.

It should be readily apparent that such a termination design is advantageous in that the craftsman is not required to have a great deal of skill in terminating the optical fiber 2, 4 to the optical fiber contact 6, 8. Specifically, the user is not required to polish the optical fiber 2, 4 being terminated, size the optical fiber to be terminated with a connector, apply either epoxies, glues, or liquids thereto, and is not required to precisely align the optical fiber being terminated with the contact or with any lenses. Accordingly, a minimum amount of skill in the field is required, thus rendering the optical fiber contact of the invention extremely useful since all the critical manufacturing steps have been previously carried out in a factory where optimal production is best suited and best achieved Subsequent to terminating a first optical fiber 2 to a first optical fiber contact 6, and a second optical fiber 4 to a second optical fiber contact 8, it is then necessary to optically connect front ends 21 of the first and second optical fiber contacts 6, 8, this being accomplished by the optical fiber contact assembly 60, schematically illustrated in FIG. 1. FIGS. 6 through 9 illustrate further details of the assembly 60 which will now be described. The assembly 60 is optimally adaptable for optically connecting a plurality of first optical fiber contacts 6, disposed in a ribbon array, with a like plurality of second optical fiber contacts 8, also disposed in a ribbon array, each contact 6 being aligned and optically connected to a corresponding mating contact 8.

The assembly 60 includes a receptacle shell 62 which is matable with a plug shell 64, the shells 62, 64 being retained together by any appropriate means, such as by screws 67 or nuts and bolts interconnecting flanges 63 of the shells. The shells 62, 64 bottom at point 65 to a fixed position.

Each contact 6, 8 has a short screw thread 66 formed on an outer circumferential surface thereof, for example, of the order of 1 to 3 turns the screw thread extending rearward from a flange 68 formed on the contact body 22. A contact spring 70 is screwed onto the screw thread 66 so as to extend rearwardly from the flange 68, as illustrated in FIG. 6, with a front end of the spring 70 contacting the flange 68. Since the spring 70 is screwed onto the contact body 22, the spring cannot accidentally fall off the contact body during an assembly or disassembly operation of the optical fiber contact assembly 60. The back end of the contact spring 70 contacts a shoulder 72 of a first wafer 74 interconnected with a second wafer 76, the first and second interconnected wafers forming slots 78, each slot 78 forming an axially extending cavity which receives the back end of an individual contact 6, 8. The wafers 74, 76 in the shell 62 are preferably of identical construction to the wafers 74, 76 in the shell 64.

FIG. 8 illustrates further details of the wafers 74, 76. The first wafer 74 contains a plurality of the slots 78 formed therein, the slots 78 being disposed parallel with one another as illustrated, and having an open top section which is to be closed by the second wafer 76. A back end of the first wafer 74 has the shoulder formed thereat which engages a back end of the contact spring 70, with the wafers being connected so as to preload and compress the springs 70. Front end of the contact 6, 8 extends through holes 112 formed in a front face of the wafer 76. Top portions of the slots 78 have narrow portions 82 which are designed so that the contacts 6, 8 cannot be easily removed from the slots 78 along a direction of an arrow 84 which extends perpendicular to a longitudinal axis of the slots 78 to facilitate assembly of the contacts 6, 8 into the slots of the first wafer 74 prior to disposing the second wafer 76 onto the first wafer. The wafers 74, 76 have engaging extensions 86 and recesses 87 respectively on side surfaces thereof, which surfaces are slightly resilient, being made preferably of plastic, for snap connecting the wafer 74 with the wafer 76 as the wafer 76 is slid onto the wafer 74 along a direction essentially parallel to the longitudinal axis of the contacts 6, 8 disposed in the slots 78. With this construction the wafers 74, 76 can easily be connected and disconnected from one another thus allowing a craftsman to remove any contact from the slot 78 for cleaning or replacement.

The plug shell 64, in addition to containing the wafers 74, 76 having the contacts 6 or 8 disposed in the slots 78, further contains an alignment insert 88 which is connected to the plug shell 64 via a pin 90. The pin prevents the alignment insert from being separated from the plug shell 64 and inadvertently being lost. The alignment insert 88 further contains a longitudinal slot 92 which extends parallel with slots 78 in the wafer 74 so as to provide a means for sliding the alignment insert 88 onto front ends of the contacts 6, 8 so that the front ends of the contacts 6, 8 are received in longitudinal holes 94 contained within the alignment insert 88, the holes 94 being parallel with the slots 78. Thus, it can readily be understood that, to remove the alignment insert from the contacts 8, it is simply necessary to disconnect the plug shell 62 from the plug shell 64, move the alignment insert 88 longitudinally in a direction of the longitudinal axis of the contacts 8 and away from front ends thereof, and then subsequently pivot the alignment insert about the pin 90. With such a construction, front ends of the contacts 8 are easily accessible for cleaning, and a minimum risk exists that the alignment insert will be lost in the cleaning process due to the engagement via the pin 90.

The alignment insert 88 comprises two parts which are bonded at joint 96, with the alignment insert containing the plurality of longitudinal holes 94, each for receiving one of the contacts 6 and a mating contact 8 to be optically connected therewith. Within each hole 94 is contained an alignment sleeve 98, retained in place by flanges 99. Each alignment sleeve 98 comprises a radial spring in the form of a cylinder that is split axially, a spring constant of each alignment sleeve being chosen so as to allow compression and extension of the contact springs 70 during shock and vibration loads.

The alignment sleeve further acts as a damper so as to reduce shock- and vibration-induced displacements. The alignment sleeve for each mating set of first and second contacts 6, 8 can be a single sleeve or multiple sleeves optionally tied together. Ends of the alignment sleeves, the alignment insert, and the contact bodies 22 of the contacts 6, 8 are preferably chamfered to facilitate guiding of the contacts into the alignment sleeve.

As illustrated in FIG. 9 since each alignment sleeve 98 comprises a cylinder split axially which contains front ends of a contact 6 and a mating contact 8, since outside cylindrical surfaces of the contacts 6, 8 are circular while an inner surface of the alignment sleeve is necessarily not, it can readily be understood that the alignment sleeve contacts each of the contacts 6, 8 along three longitudinal lines, ends of which are illustrated by reference numerals 100, 101, 102. Since the longitudinal line 100 is disposed along a bottom-most portion of the contacts 6, 8, bottom portions of the contacts 6, 8 are co-linearly aligned thus achieving excellent alignment between the front ends of the mating contacts 6, 8. Accordingly, the alignment sleeve 98 provides an excellent alignment means. The lines 101, 102 do not necessarily have to be located on circumferential ends of the sleeve 98, as illustrated in FIG. 9, and can alternatively be located at other circumferential locations, for example, lines ending at points 103, 104, etc., by appropriate shaping.

A dynamic seal 46 is bonded to the alignment insert 88 on opposite sides thereof where the contacts are inserted therein to provide a moisture seal for the front ends 21 of the contacts 6, 8 being optically interconnected. The dynamic seal further prevents foreign matter from entering the interface between the front ends 21 of the contacts 6, 8. The seal 46 is resiliently formed and designed to accommodate deflections induced by movements of the contacts 6, 8. The dynamic seal has holes 48 therein for each contact 6, 8 to be received, each hole having an inside diameter smaller than an outside diameter of the contact body of the contact being placed there through, thereby providing a stretched interface fit between the seal 46 and the contact 6, 8. The seal therefore allows necessary movement of the contacts created by vibration or shock loads, and the seal further provides a lead-in guide for the contacts to facilitate insertion thereof into the alignment insert 88 and the alignment sleeve 98. Spaces 50 are provided on opposite sides of the dynamic seal to allow movement and displacement of the resilient seal material.

One edge 87 of each dynamic seal 46 has a triangular shape and engages the wafer 76 to provide a minimum amount of resistance during displacement of the seal due to the buildup of tolerances in the components making up the connector assembly. Accordingly, it will be appreciated that the basic seal path sealed by the dynamic seal occurs where the dynamic seal 46 is bonded to the alignment insert 88, and also where the dynamic seal meets the contact 6 or 8.

The assembly 60 provides a dependable, reliable, efficient, and simple means of aligning and interconnecting a plurality of first contacts 6, preferably disposed in ribbon form, with a like plurality of second contacts 8 also disposed in ribbon form. Front ends of the contacts 6, 8 are easily accessible for cleaning, and the construction of the assembly 60 is such that a minimum amount of risk exists that any of the tiny parts making up the assembly 60 can inadvertently be lost. Therefore, the contacts 6, 8 and the assembly 60 provide a superior means for terminating and optically connecting a plurality of first optical fibers 2 with a like plurality of second optical fibers 4 with a minimum amount of attenuation, the assembly 60 being capable of withstanding severe shock and vibration loads.

Though the invention has been described with reference to certain preferred embodiments thereof, it should be understood that the invention is not to be limited thereby and is only to be limited by the appended claims.

What is claimed is:

1. An assembly for optically aligning a first optical fiber contact with a second optical fiber contact, comprising:
    first and second interconnected shells, said first shell retaining said first contact so as to be matable with said second contact retained by said second shell;
    means for axially biasing said first contact towards said second contact;
    means for aligning ends of said first and second contacts to be optically aligned;
    first and second dynamic seals for sealing opposite ends of said alignment means where said first and second contacts enter said alignment means, each of said dynamic seals being secured to said opposite ends of said alignment means, said first and second dynamic seals having holes therein having inside diameters smaller than an outside diameter of said first and second contacts, respectively, spaces being provided on opposite axial ends of each of said dynamic seals in a vicinity of said holes to allow movement of said dynamic seals in an axial direction during shock and vibration loads.

2. The assembly as claimed in claim 1, said alignment means including a cylindrical radial spring which is split axially, said radial spring having a spring constant less than a spring constant of said axial biasing means, said alignment means bringing said first and second contacts into alignment.

3. The assembly as claimed in claim 2, said cylindrical radial spring comprising multiple cylindrical radial springs disposed in series.

4. The assembly as claimed in claim 2, said first and second contacts each having a flange and a screw thread formed on an outer cylindrical surface thereof, said screw thread extending from said flange toward a back end of said contact, said biasing means comprising first and second axial springs screwed onto said screw thread of said respective first and second contacts.

5. The assembly as claimed in claim 4, further comprising first and second means for retaining said back ends of said first and second contacts and said first and second springs in holes formed so as to provide a compressive force on said first and second axial springs.

6. The assembly as claimed in claim 5, each of said first and second dynamic seals having a triangular cross-sectional shape on an axial end thereof opposite said alignments.

7. The assembly as claimed in claim 6, said alignment means further comprising an alignment insert containing said cylindrical radial spring in an aperture therein, and further comprising means for pivoting said alignment insert to one of said shells.

8. The assembly as claimed in claim 7, further comprising a plurality of first contacts and a corresponding plurality of said second contacts, each of said second contacts being optically aligned with a corresponding one of said first contacts, said first and second contacts being retained by said first and second shells in ribbon-type arrays, said biasing means axially biasing each of said first contacts towards said corresponding second contacts and axially biasing each of said second contacts towards said corresponding first contacts, each of said corresponding first and second contacts being aligned by one of said cylindrical radial springs.

9. The assembly as claimed in claim 1, further comprising means for holding back ends of the first and second contacts so as to allow said contacts to move axially in response to tolerance variations, said holding means including first and second wafers having engaging extensions and recesses which allow said wafers to be connected and disconnected by movement along the axial direction of the contacts.

10. An assembly for optically aligning a first optical fiber contact with a second optical fiber contact, comprising:

first and second interconnected shells, said first shell retaining said first contact so as to be matable with said second contact retained by said second shell;

means for axially biasing said first contact towards said second contact;

means for aligning ends of said first and second contacts to be optically aligned, said aligning means comprising an alignment sleeve having a cylindrical shape, said alignment sleeve being split longitudinally along the axial direction thereof; and first and second dynamic seals for sealing front ends of said first and second contacts from the environment, each of said dynamic seals being secured to opposite ends of said alignment means.

11. The assembly as claimed in claim 10, said alignment sleeve comprising a cylindrical radial spring having a spring constant less than a spring constant of said axial biasing means, said alignment means bringing said first and second contacts into alignment.

12. The assembly as claimed in claim 10, said cylindrical radial spring comprising multiple cylindrical radial springs disposed in series.

13. The assembly as claimed in claim 10, said first and second contacts each having a flange and a screw thread formed on an outer cylindrical surface thereof, said screw thread extending from said flange toward a back end of said contact, said biasing means comprising first and second axial springs screwed onto said screw thread of said respective first and second contacts.

14. The assembly as claimed in claim 13, further comprising first and second means for retaining said back ends of said first and second contacts and said first and second springs in holes formed so as to provide a compressive force on said first and second axial springs.

15. The assembly as claimed in claim 14, each of said first and second dynamic seals having a triangular cross sectional shape on an axial end thereof opposite said alignment means.

16. The assembly as claimed in claim 15, said alignment means further comprising an alignment insert containing said cylindrical radial spring in an apparatus therein, and further comprising means for pivoting said alignment insert to one of said shells.

* * * * *